United States Patent
Bogner et al.

(10) Patent No.: US 11,422,230 B2
(45) Date of Patent: Aug. 23, 2022

(54) SYSTEM AND METHOD FOR RECEIVING A RADAR SIGNAL

(71) Applicant: Infineon Technologies AG, Neubiberg (DE)

(72) Inventors: Peter Bogner, Wernberg (AT); Christoph Affenzeller, Linz (AT); Alexander Melzer, Neutillmitsch (AT); Martin Wiessflecker, Graz (AT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 254 days.

(21) Appl. No.: 16/563,246

(22) Filed: Sep. 6, 2019

(65) Prior Publication Data
US 2021/0072346 A1  Mar. 11, 2021

(51) Int. Cl.
*G01S 7/35* (2006.01)
*G01S 13/58* (2006.01)
*G01S 7/285* (2006.01)

(52) U.S. Cl.
CPC ............ *G01S 7/354* (2013.01); *G01S 13/584* (2013.01); *G01S 7/285* (2013.01); *G01S 7/356* (2021.05)

(58) Field of Classification Search
CPC ........ G01S 7/354; G01S 13/584; G01S 7/285; G01S 7/356; G01S 13/42
See application file for complete search history.

(56) References Cited

U.S. PATENT DOCUMENTS

| 7,259,716 | B1* | 8/2007 | Dubbert | G01S 7/28 342/131 |
|---|---|---|---|---|
| 2008/0106460 | A1* | 5/2008 | Kurtz | G01S 13/34 342/99 |
| 2012/0026039 | A1* | 2/2012 | Ganeshan | G01S 19/37 342/357.73 |
| 2014/0313071 | A1 | 10/2014 | McCorkle | |
| 2016/0077134 | A1* | 3/2016 | Rezk | H04K 3/00 324/76.39 |
| 2019/0242973 | A1* | 8/2019 | Schat | G01S 7/4008 |
| 2020/0292665 | A1* | 9/2020 | Behrens | G01S 13/325 |

FOREIGN PATENT DOCUMENTS

| EP | 3339881 A1 | 6/2018 |
|---|---|---|
| WO | 2016086007 A1 | 6/2016 |
| WO | 2017187278 A1 | 11/2017 |

\* cited by examiner

*Primary Examiner* — Erin F Heard
*Assistant Examiner* — Ismaaeel A. Siddiquee
(74) *Attorney, Agent, or Firm* — Slater Matsil, LLP

(57) ABSTRACT

A method includes: receiving a reflected radar signal including a first radar chirp signal during a first chirp time period and a second radar chirp signal during a second chirp time period; downconverting the reflected radar signal to form a baseband signal; adding a DC offset to the baseband signal to form a DC offset baseband signal, adding the DC offset including adding a first DC offset to the baseband signal during the first chirp time period, and adding a second DC offset to the baseband signal during the second chirp time period, where the first DC offset is different from the second DC offset; and digitizing the DC offset baseband signal using an analog-to-digital converter to form a digitized baseband signal.

26 Claims, 9 Drawing Sheets

SYSTEM AND METHOD FOR RECEIVING A RADAR SIGNAL

TECHNICAL FIELD

The present invention relates generally to a system and method for receiving a radar signal.

BACKGROUND

Applications in the millimeter-wave frequency regime have gained significant interest in the past few years due to the rapid advancement in low-cost semiconductor technologies such as silicon germanium (SiGe) and fine geometry complementary metal-oxide semiconductor (CMOS) processes. Availability of high-speed bipolar and metal-oxide semiconductor (MOS) transistors has led to a growing demand for integrated circuits for mm-wave applications at 60 GHz, 77 GHz, and 80 GHz and also beyond 100 GHz. Such applications include, for example, automotive radar and multi-gigabit communication systems.

In some radar systems, the distance between the radar and a target is determined by transmitting a frequency modulated signal, receiving a reflection of the frequency modulated signal, and determining a distance based on a time delay and/or frequency difference between the transmission and reception of the frequency modulated signal. In many radar systems, this frequency difference is downconverted using a mixer and analyzed using frequency a frequency transformation, such as a Fast Fourier Transform (FFT). The resolution, accuracy, and sensitivity of the radar system may depend, in part, on the linearity spurious performance of the radar's RF receive circuitry and baseband circuitry. When frequency spurs generated by the radar's receive path have an amplitude on the same order of magnitude of frequency content generated by small or distant reflected objects, the radar system may have difficulty distinguishing internally generated spurs from low power reflections from small or distant objects.

SUMMARY

In accordance with an embodiment, a method includes: receiving a reflected radar signal including a first radar chirp signal during a first chirp time period and a second radar chirp signal during a second chirp time period; downconverting the reflected radar signal to form a baseband signal; adding a DC offset to the baseband signal to form a DC offset baseband signal, adding the DC offset including adding a first DC offset to the baseband signal during the first chirp time period, and adding a second DC offset to the baseband signal during the second chirp time period, where the first DC offset is different from the second DC offset; and digitizing the DC offset baseband signal using an analog-to-digital converter to form a digitized baseband signal.

In accordance with another embodiment, a radar system includes: an RF front-end configured to be coupled to an antenna, the RF front-end configured to receive a radar signal including a first radar chirp signal during a first chirp time period and a second radar chirp signal during a second chirp time period; a mixer having an input coupled to an output of the RF front-end; a signal path having an input coupled to an output of the mixer; an analog-to-digital converter having an input coupled to an output of the signal path and an output configured to provide a digitized baseband signal; and a DC offset circuit configured to add a first DC offset in the signal path during the first chirp time period, and configured to add a second DC offset in the signal path during the second chirp time period, where the first DC offset is different from the second DC offset.

In accordance with a further embodiment, a radar system includes: a frequency modulated continuous wave (FMCW) radar transceiver configured to transmit and receive a plurality of chirps within a frame, where each of the plurality of chirps are transmitted and received in a corresponding plurality of chirp time periods; a baseband receive signal path coupled to a receive output of the FMCW radar transceiver, a DC offset circuit configured to produce a DC offset in the baseband receive signal path, the DC offset having a different DC offset values associated with adjacent chirp time periods of the plurality of chirp time periods; an analog-to-digital converter coupled to an output of the baseband receive signal path; and a signal processing circuit coupled to an output of the analog-to-digital converter, the signal processing circuit configured to perform a plurality of frequency transformations of an output signal of the analog-to-digital converter corresponding to the plurality of chirp time periods to produce a plurality of frequency transformed chirp signals, generate a range-Doppler map based on plurality of frequency transformed chirp signals, and detect a target based on the range-Doppler map.

In accordance with another embodiment, a method includes: receiving a reflected radar signal including a plurality of chirps within a frame, where each of the plurality of chirps are transmitted and received in a corresponding plurality of chirp time periods; downconverting the reflected radar signal to form a baseband signal; adding a DC offset to the baseband signal to form a DC offset baseband signal, adding the DC offset including adding a plurality of DC offsets corresponding to the plurality of chirp time periods; and digitizing the DC offset baseband signal using an analog-to-digital converter to form a digitized baseband signal.

In accordance with a further embodiment, a method includes: receiving a wireless signal including a first RF signal during a first time period and a second RF signal during a second time period; downconverting the wireless signal to form a baseband signal; adding a DC offset to the baseband signal to form a DC offset baseband signal, adding the DC offset including adding a first DC offset to the baseband signal during the first time period, and adding a second DC offset to the baseband signal during the second time period, where the first DC offset is different from the second DC offset; and digitizing the DC offset baseband signal using an analog-to-digital converter to form a digitized baseband signal.

In accordance with another embodiment, a method includes: receiving an analog signal including a first signal during a first time period and a second signal during a second time period; adding a DC offset to the received analog signal to form a DC offset signal, adding the DC offset including adding a first DC offset to the received analog signal during the first time period, and adding a second DC offset to the received analog signal during the second time period, where the first DC offset is different from the second DC offset; and digitizing the DC offset signal using an analog-to-digital converter to form a digitized signal.

BRIEF DESCRIPTION OF THE DRAWINGS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a system and method for operating a millimeter wave frequency modulated continuous wave (FMCW) radar system. The invention may applied to various types of radar systems including, but not limited to automotive radar systems, gesture recognition radar systems, radar sensing systems, and aircraft radar systems. Embodiments of the invention may also be applied to radar systems that utilize RF frequency ranges outside of the millimeter-wave frequency range, as well as to other types of RF systems, such as RF communications systems.

In accordance with an embodiment, a radar system is configured to transmit a series of RF chips at a target, and receive and downconvert a reflected radar signal to an analog baseband or intermediate frequency signal. Prior to performing an analog-to-digital conversion on the analog baseband or intermediate frequency signal, the DC offset of the analog baseband or intermediate frequency signal is adjusted on a chirp-by-chirp basis. In various embodiments, adjusting the DC offset in this manner causes a shift in spur frequencies from chirp to chirp, thereby spreading spurious power over different frequencies. In some embodiments, these spur frequencies are generated by an analog-to-digital converter having a distortion characteristic that is sensitive to DC offset.

When the analog baseband or intermediate signal is further digitally processed (e.g., by transforming the analog baseband or intermediate signal to the frequency domain and deriving a range-Doppler map), the magnitude of the spur-induced "ghost targets" is reduced, which advantageously leads to a higher effective SFDR.

Advantageous aspects of embodiments further include the ability to accurately detect smaller and/or more distant targets without significantly increasing the power and complexity of the radar receiver. An additional advantage includes the ability to maintain high detection performance while using a low power analog-to-digital converter that is prone to distortion.

Figure 1A:
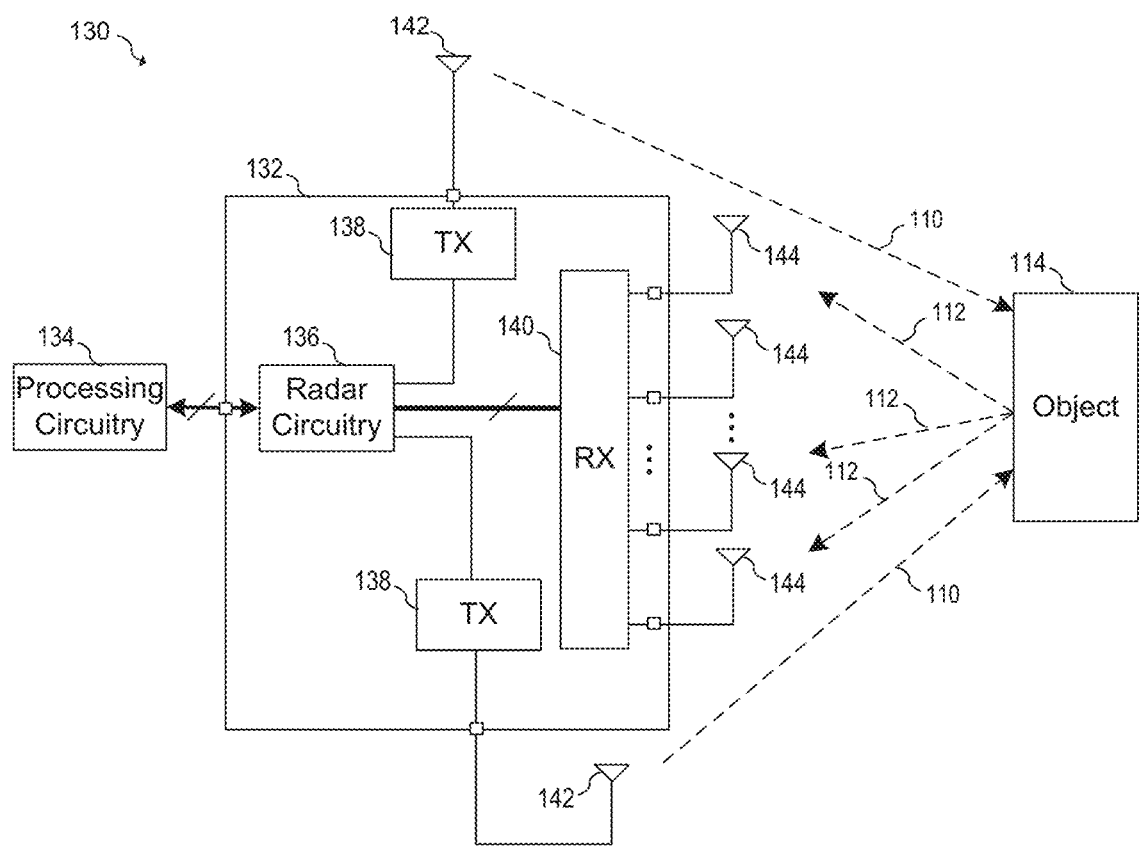
FIG. 1A illustrates a block diagram of an embodiment radar system.

FIG. 1A illustrates a block diagram of an embodiment radar system 130 that includes radar front-end circuit 132 (also referred to as an RF front-end) and processing circuitry 134. During operation, the position and velocity of target 114 may be detected by radar system 130. Radar system 130 may be implemented, for example, using a two-dimensional mm-wave phase-array radar that measures the position and relative speed of target 114. In some embodiments, the mm-wave phase-array radar transmits and receives signals in the 57 GHz to 64 GHz range. Alternatively, frequencies outside of this range may also be used. In some embodiments, radar front-end circuit 132 operates as a frequency modulated continuous wave (FMCW) radar sensor or FMCW radar transceiver having multiple transmit and receive channels. In other embodiments, other types of radar systems may be used such as a pulse modulated radar system to implement radar front-end circuit 132.

Radar front-end circuit 132 transmits and receives radio signals for detecting target 114 in three-dimensional space. For example, radar front-end circuit 132 transmits an incident RF signal and receives an RF signal that is a reflection of the incident RF signal from target 114. The received reflected RF signal is downconverted by radar front-end circuit 132 to determine beat frequency signals. These beat frequency signals may be used to determine information such as the location, speed, angle, etc., of target 114 in three-dimensional space.

In various embodiments, radar front-end circuit 132 is configured to transmit incident RF signals 110 toward target 114 via transmit antennas 142 and to receive reflected RF signals 112 from target 114 via receive antennas 144. Radar front-end circuit 132 includes transmitter front-end circuits 138 coupled to transmit antennas 142 and receiver front-end circuit 140 coupled to receive antennas 144.

During operation, transmitter front-end circuits 138 may transmit RF signals toward target 114 one at a time or simultaneously. While two transmitter front-end circuits 138 are depicted in FIG. 1C, it should be appreciated that radar front-end circuit 132 may include fewer or greater than two transmitter front-end circuits 138. Each transmitter front-end circuit 138 includes circuitry configured to produce the incident RF signals. Such circuitry may include, for example, RF oscillators, upconverting mixers, RF amplifiers, variable gain amplifiers, filters, transformers, power splitters, and other types of circuits.

Receiver front-end circuit 140 receives and processes the reflected RF signals from target 114. As shown in FIG. 1C, receiver front-end circuit 140 is configured to be coupled to four receive antennas 144, which may be configured as a 2×2 antenna array. In alternative embodiments, receiver front-end circuit 140 may be configured to be coupled to greater or fewer than four antennas, with the resulting antenna array being of various n×m dimensions depending on the specific embodiment and its specifications. Receiver front-end circuit 140 may include, for example, RF oscillators, downconversion mixers, RF amplifiers, variable gain amplifiers, filters, transformers, power combiners and other types of circuits.

Radar circuitry 136 provides signals to be transmitted to transmitter front-end circuits 138, receives signals from receiver front-end circuit 140, and may be configured to control the operation of radar front-end circuit 132. In some embodiments, radar circuitry 136 includes, but is not limited to, frequency synthesis circuitry, upconversion and downconversion circuitry, variable gain amplifiers, analog-to-digital converters, digital-to-analog converters, digital signal processing circuitry for baseband signals, bias generation circuits, and voltage regulators.

Radar circuitry 136 may receive a baseband radar signal from processing circuitry 134 and control a frequency of an RF oscillator based on the received baseband signal. In some embodiments, this received baseband signal may represent an FMCW frequency chip to be transmitted. Radar circuitry 136 may adjust the frequency of the RF oscillator by applying a signal proportional to the received baseband signal to a frequency control input of a phase locked loop. Alternatively, the baseband signal received from processing circuitry 134 may be upconverted using one or more mixers. Radar circuitry 136 may transmit and digitize baseband signals via a digital bus (e.g., a USB bus), transmit and receive analog signals via an analog signal path, and/or transmit and/or receive a combination of analog and digital signals to and from processing circuitry 134.

Processing circuitry 134 acquires baseband signals provided by radar circuitry 136 and performs one or more signal processing steps to evaluate them. In an embodiment, processing circuitry 134 acquires a baseband signal that represents the beat frequency signals. The signal processing steps may include performing a fast Fourier transform (FFT), a short-time Fourier transform (STFT), target classification, machine learning, and the like. In addition to processing the acquired baseband signals, processing circuitry 134 may also control aspects of radar front-end circuit 132, such as the transmissions produced by radar front-end circuit 132.

The various components of radar system 130 may be partitioned in various ways. For example, radar front-end circuit 132 may be implemented on one or more RF integrated circuits (RFICs), antennas 142 and 144 may be disposed on a circuit board, and processing circuitry 134 may be implemented using a processor, a microprocessor, a digital signal processor and/or a custom logic circuit disposed on one or more integrated circuits/semiconductor substrates. Processing circuitry 134 may include a processor that executes instructions stored in a non-transitory memory to perform the functions of processing circuitry 134. In some embodiments, however, all or part of the functionality of processing circuitry 134 may be incorporated on the same integrated circuit/semiconductor substrate on which radar front-end circuit 132 is disposed.

In some embodiments, some or all portions of radar front-end circuit 132 may be implemented in a package that contains transmit antennas 142, receive antennas 144, transmitter front-end circuits 138, receiver front-end circuit 140, and/or radar circuitry 136. In some embodiments, radar front-end circuit 132 may be implemented as one or more integrated circuits disposed on a circuit board, and transmit antennas 142 and receive antennas 144 may be implemented on the circuit board adjacent to the integrated circuits. In some embodiments, transmitter front-end circuits 138, receiver front-end circuit 140, and radar circuitry 136 are formed on the same radar front-end integrated circuit (IC) die. Transmit antennas 142 and receive antennas 144 may be part of the radar front-end IC die, or may be separate antennas disposed over or adjacent to the radar front-end IC die. The radar front-end IC die may further include conductive layers, such as redistribution layers (RDLs), used for routing and/or for the implementation of various passive or active devices of radar front-end circuit 132. In an embodiment, transmit antennas 142 and receive antennas 144 may be implemented using the RDLs of the radar front-end IC die.

Figure 1B:
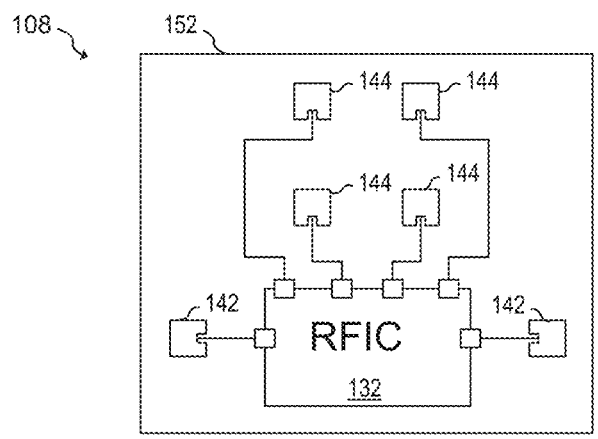
FIG. 1B illustrates a top view of a portion of the radar system of FIG. 1A.

FIG. 1B illustrates a top view of the RF portion of radar system 130 that includes radar front-end circuit 132 implemented as an RFIC coupled to transmit antennas 142 and receive antennas 144 implemented as patch antennas disposed on or within substrate 152. In some embodiments, substrate 152 may be implemented using a circuit board on which radar front-end circuit 132 is disposed and on which transmit antennas 142 and receive antennas 144 are implemented using conductive layers of the circuit board. Alternatively, substrate 152 represents a wafer substrate on which one or more RDLs are disposed and on which transmit antennas 142 and receive antennas 144 are implemented using conductive layers on the one or more RDLs. It should be appreciated that the implementation of FIG. 1B is just one of many ways that embodiment radar systems could be implemented.

Figure 2A:
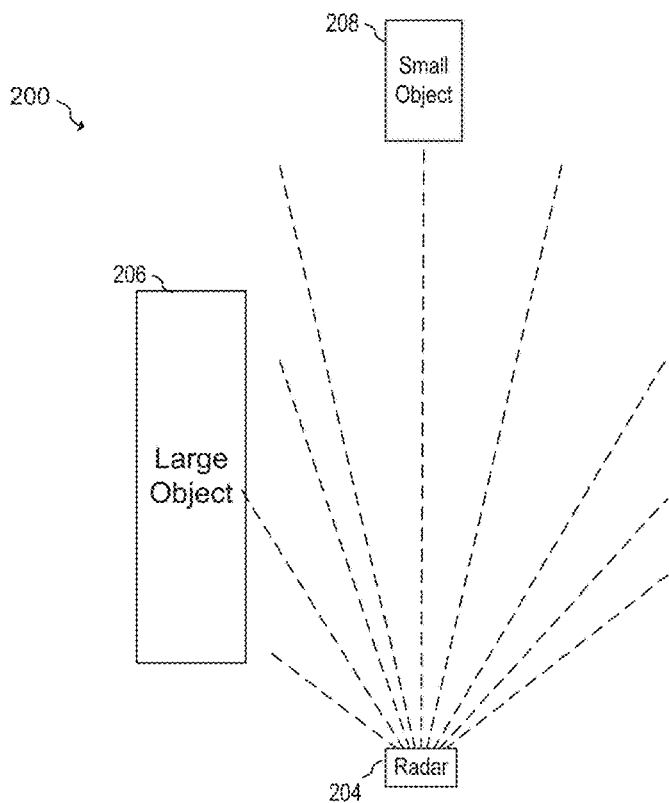
FIGS. 2A, 2B and 2C illustrate a diagram and corresponding waveform diagrams of an embodiment radar scenario.

FIG. 2A illustrates an example radar scenario 200 in which radar system 204 transmits and receives, for example, a frequency modulated continuous wave (FMCW) signal, and detects reflections of this transmitted signal in order to determine a distance between radar system 204 and other objects within range of radar system 204. In various embodiments, radar system 204 is implemented according to radar system 130 described above with respect to FIGS. 1A and 1B. In the illustrated scenario 200, a large object 206, is closer to radar system 204 than a small a small object 208. Radar system 204 may represent, for example, an automotive radar, in which case large object 206 may represent a large vehicle, such as a truck traveling close to radar system 204 and small object 208 may represent a small vehicle, such as a motorcycle traveling at a larger distance from radar system 204 than large object 206. Under normal operating conditions, the echo or reflection off large object 206 has a higher amplitude than the echo or reflection off small object 208 because large object 206 is both larger and closer to radar system 204 than small object 208.

Figure 2B:
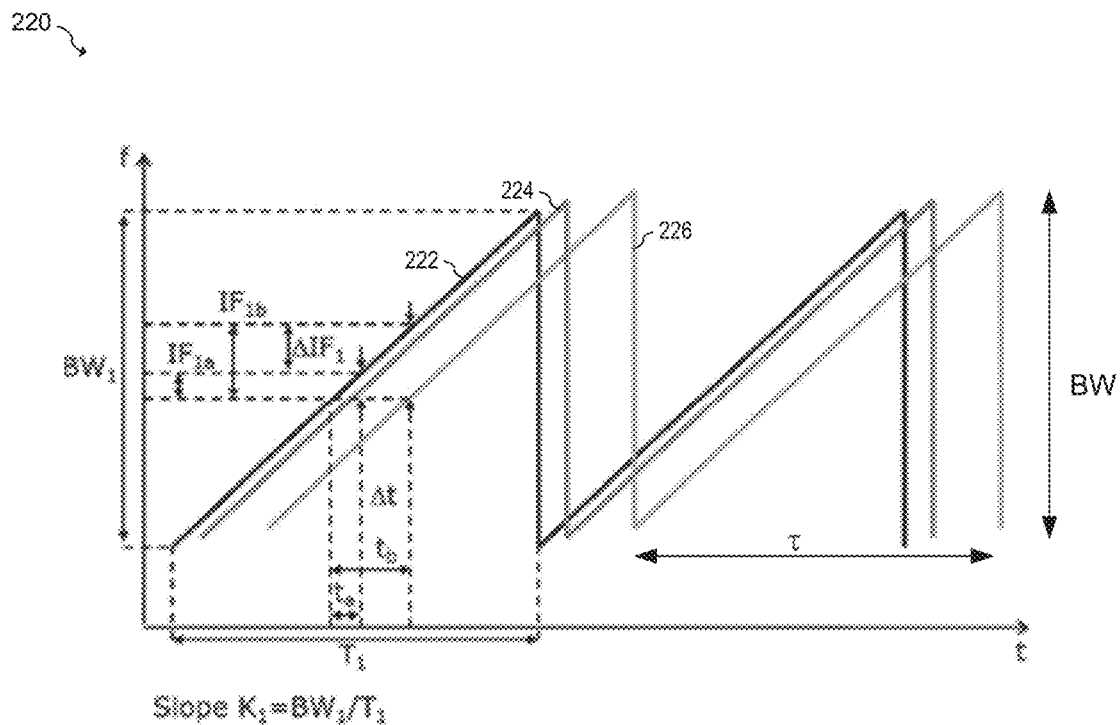

FIG. 2B illustrates a waveform diagram 220 that corresponds to an FMCW radar scenario described above with respect to FIG. 2A. Signal 222 represents the frequency of the radar signal transmitted by radar system 204, signal 224 represents the frequency of the signal reflected by large object 206 and signal 226 represents the signal reflected by small object 208. Signals 222, 224 and 226 may also be referred to as "chirp signals." The delay from the transmission of the transmit signal to the receipt of the signal reflected by large object 206 is $t_a$ and the delay from the transmitted signal to the receipt of the signal reflected by small object 208 is $t_b$. These time delays in reception cause a frequency offset between the transmitted signal and the received signal. In various embodiments, the transmitted signal is mixed with the received signal using a mixer to create an intermediate frequency signal that represents the difference in frequency between the transmitted signal and the received signal. As shown, the difference in frequency from the transmitted signal 222 to the received reflected signal 224 from the large object 206 is $IF_{1a}$ and the difference in frequency from the transmitted signal 222 to the received reflected signal 226 from the small target 108 is $IF_{1b}$. The bandwidth BW of the FMCW radar system is related to the difference between the maximum and minimum transmitted signal.

In various embodiments, the difference between the radar signal transmitted by radar system 204 (signal 222) and the signal received by radar system 204 is mixed together to form a baseband or intermediate frequency signal. The frequency of this baseband or intermediate frequency signal represents the difference between the radar signal transmitted by radar system 204 and the signal received by radar system 204. As explained above with respect to FIG. 2B, this frequency difference is proportional to the distance of the detected object and radar system 204. Thus, reflections from objects farther from radar system 204 (such as small object 208) exhibit a larger frequency difference than reflections from objects closer to radar system 204 (such as large object 206). In various embodiments, the time-domain analog baseband or intermediate frequency signal is digitized and a transformed into the frequency domain using a frequency transformation such as an FFT. By using an FFT or other frequency transformation algorithm, multiple objects can be detected by examining the amplitude of the various frequency bins of the FFT. An example of this is illustrated in FIG. 2C, which shows a frequency diagram 230 of the baseband or intermediate frequency signal produced by radar system 204 according to radar scenario 200 depicted in FIG. 2A.

Figure 2C:
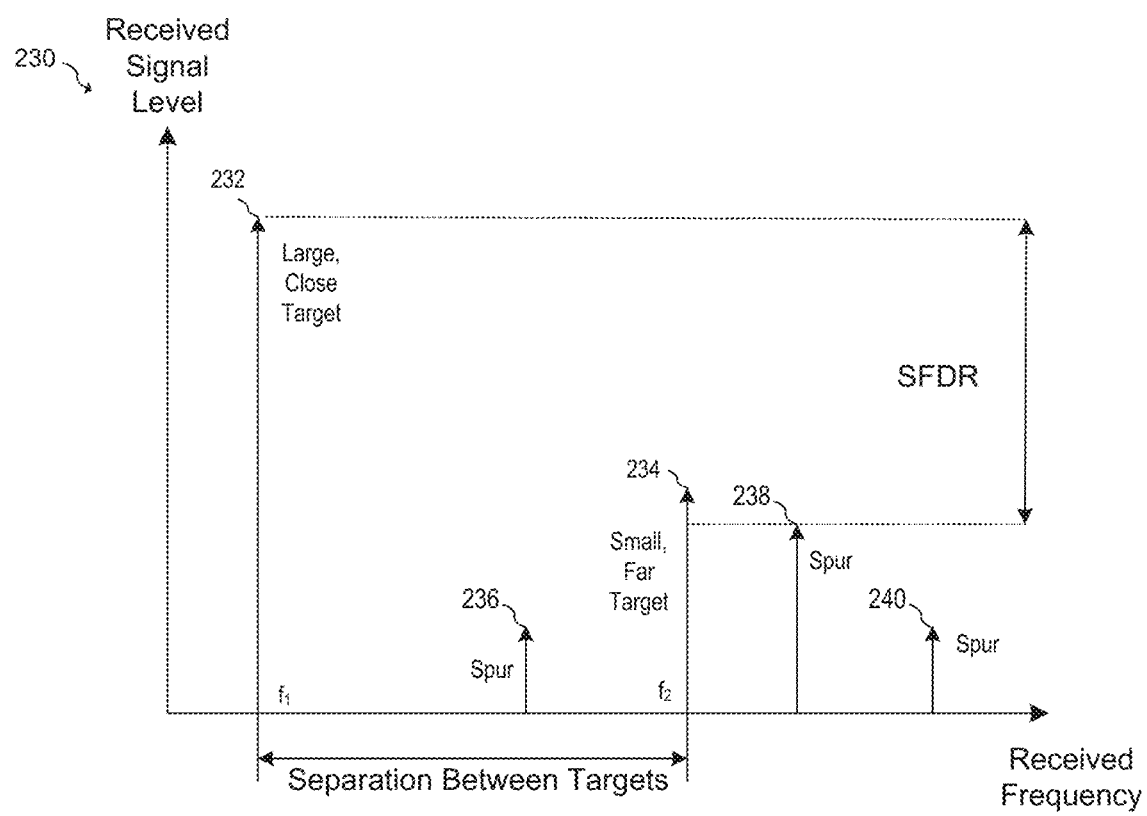

In the frequency diagram 230 of FIG. 2C, signal 232 at frequency f1 represents the reflection from large object 206 and signal 234 at frequency f2 represents the reflection from small object 208. The amplitude of signal 234 representing small object 208 is less than the amplitude of signal 232 representing large object 206 because the amount of power reflected by small object 208 is less than the amount of power reflected by large object 206 due to its small size and its distance from radar system 204. Signals 236, 238 and 240 at various frequencies represent spurious signals that are generated by the distortion characteristics of the analog-to-digital converter within the signal path of radar system 204 that digitizes the baseband or intermediate frequency signal. One measure of the SFDR of the system is the difference in power between signal 232 representing large object 206 and signal 238 representing the highest amplitude spur. Thus, the higher the maximum amplitude of spurious signals 236, 238 and 240, the lower the effective sensitivity of radar system 204. In some circumstances, high spurious signals may appear as "ghost targets" to radar system 204, which may cause radar system 204 to detect non-existent objects. This is particularly problematic in radar systems, such as automotive radar systems used in autonomous driving, in which safety is a chief concern.

Figure 3A:
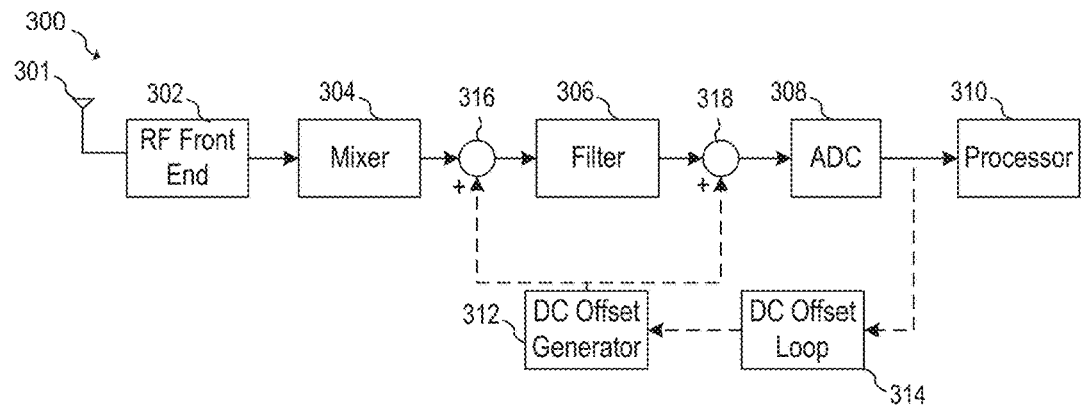
FIG. 3A illustrates an embodiment radar receive signal path.
Figure 3B:
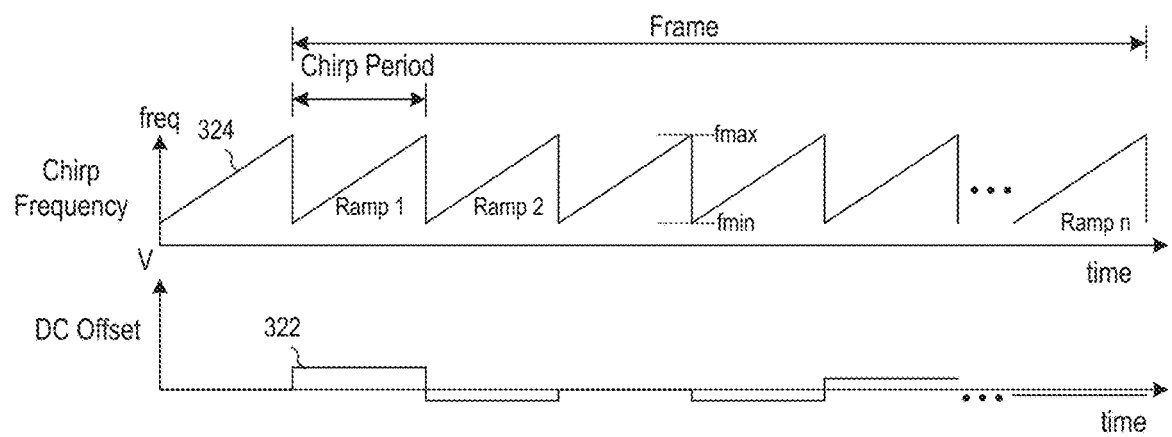
FIG. 3B illustrates a waveform diagram corresponding to the embodiment radar signal path of FIG. 3A.
Figure 3C:
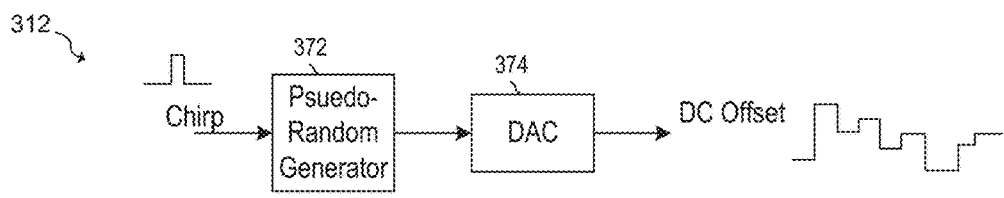
FIGS. 3C and 3D illustrate embodiment DC offset generators.
Figure 3D:
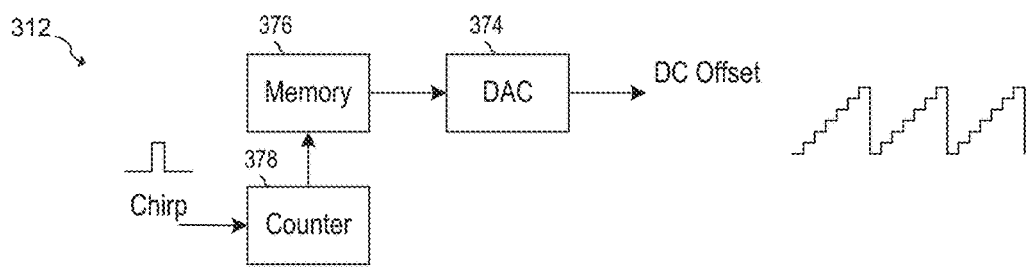

In embodiments of the present invention, the effective SFDR of a radar system is increased by changing the DC in the radar receive signal path on a chirp-by-chip basis. Such an embodiment system illustrated in FIG. 3A showing an embodiment radar receive signal path; FIG. 3B which illustrates a waveform diagram corresponding to the embodiment radar signal path of FIG. 3A; FIGS. 3C and 3D that illustrate embodiment DC offset generators; and FIGS. 4A-4C that illustrate aspects of the signal processing that occurs during operation of embodiment radar systems.

FIG. 3A illustrates embodiment radar receive signal path 300 that includes RF front end 302, mixer 304, filter 306, analog-to-digital converter (ADC) 308, processor 310, DC offset generator 312 and optional DC offset loop circuit 314. Filter 306, ADC 308, processor 310, as well as DC offset loop and summing circuits 316 and 318 may be collectively referred to as a baseband receive signal path, and the output of mixer 304 may be referred to as a receive output. In various embodiments, radar receive signal path 300 may be implemented in radar system 130 shown in FIG. 1A and/or radar system 204 shown in FIG. 2A.

In various embodiments, RF front end 302 is configured to receive an RF signal from antenna 301 and may include circuits known in the art to be associated with radar RF front ends such as one or more impedance matching networks, directional couplers, circulators, low noise amplifiers (LNAs) and other amplifiers. Mixer 304 may be implemented as a single sideband mixer or a dual sideband mixer and may include one or more mixer circuits known in the art such as a Gilbert cell mixer. Mixer 304 may also include one or more phase shifters, polyphase filters, signal buffers, LO buffers and other circuitry known in the art to support the operation of an RF downconversion mixer. In various embodiments, mixer 304 mixes the signal received by RF front end 302 with an LO signal having the same frequency of the signal transmitted by the radar system. In one specific embodiment, RF Front end is configured to receive signals having a frequency between about 76 GHz and about 81 GHz, and mixer 304 is configured to produce a baseband or intermediate frequency signal having frequencies up to about 50 MHz. Alternatively, other frequency ranges can be used depending on the particular embodiment and its specifications. While radar receive signal path 300 is illustrated as a single-ended system for simplicity of illustration, it should be understood that all of radar receive signal path 300 or portions of radar receive signal path 300 may be implemented using differential circuits and signaling in order to increase dynamic range and reject common mode disturbances.

Filter 306 is configured to filter a baseband signal within receive signal path 300 and may include one or more lowpass filters, bandpass filters and/or highpass filters that are implemented using filter circuits and methods known in the art. For example, filter 306 may be implemented using an active and/or passive filter topologies known in the art, and filter 306 may implement any suitable filter transfer function known in the art. Passive filter topologies may include but are not limited to RC filters, LC filter and RLC filters. Active filter topologies may include but are not limited to gmC filters, operational amplifier based filters and the like. Filter 306 may be a fixed filter or a tunable filter depending on the particular embodiments and its specifications. During operation, filter 306 attenuates out of band mixing products produced by mixer 304 and out of band interfering signals produced by the radar system (such as signals in the transmit signal path of the radar system), and serves as an anti-aliasing filter for ADC 308. In one example embodiment, filter 306 is implemented using a $2^{nd}$ order lowpass filter, and has a bandwidth of about 50 MHz. In alternative embodiments, other topologies and bandwidths may be used.

ADC 308 may be implemented using any type of analog-to digital converter architecture including, but not limited to, sigma-delta, successive approximation, flash, pipeline, integrating and/or dual slope. ADC 308 may be implemented using any sampling rate and bit width. In one specific example, ADC 308 may be a 14-bit A/D converter with a sampling rate of 100 MHz and a full-scale input range of 1 V. Alternatively, other bit widths, sampling rates and input ranges could be used. In various embodiments, the digital output signal of ADC 308 may exhibit a distortion characteristic that depends on the DC offset at the input of ADC 308. This distortion characteristic may be due to non-linearities in the ADC transfer function and may be more pronounced in ADC architectures that are subject to non-linearities at major code transitions, such as pipeline ADCs and successive approximation ADCs.

Processor 310 (also referred to as a "baseband processor") is coupled to the output of ADC 308 and is configured to apply radar signal processing algorithms known in the art to the digitized baseband and/or intermediate frequency signal produced by ADC 308. Processor 310 may be implemented using a programmable processor configured to execute code, specialized digital signal processing (DSP) circuitry, programmable logic such as a field programmable gate array (FPGA), custom digital logic, or any other circuitry suitable to implement embodiment signal processing algorithm. In some embodiments, processor 310 is configured to transform portions of digitized baseband and/or intermediate frequency signal into the frequency domain using an FFT or other frequency transformation algorithm including but not limited to a discrete Fourier transform (DFT) or discrete cosine transform (DCT). In some embodiments, the digitized baseband and/or intermediate frequency signal are transformed into the frequency domain on a chirp by chirp basis. Such a frequency transformation may be referred to as a "range FFT" because each bin of the resulting FFT represents energy reflected by an object at a particular range or distance. This range FFT can be used by the system to identify objects detected by the radar. Next, a further set of FFTs (or other frequency transformation algorithms) may be applied to the set of range FFTs that comprise a frame to form a range-Doppler map, which provides information regarding the velocity of each of the detected objects. In some embodiments, the range-Doppler map is used to detect the presence of objects. In further embodiments, such as multi-antenna embodiments, further frequency transformations may be applied to the range data and/or the range-Doppler data from multiple antennas in order to determine the angle at which particular objects are positioned with respect to the radar system using beamforming systems and methods known in the art. In some embodiments, these further frequency transformations may be implemented using FFTs, in which case they may be referred to as "azimuth FFTs."

During operation, DC offset generator 312 generates a DC offset value that is added to radar receive signal path 300 via summing circuit 316 coupled to the input of filter 306 and/or via summing circuit 318 coupled to the output of filter 306. In other embodiments, the DC offset is added to the radar receive signal path 300 by shifting a phase of the transmitted RF signal, by shifting a phase of the LO (not shown) or the input signal to mixer 304 and/or by adjusting a bias voltage or current of mixer 304. Alternatively, the DC offset of radar receive signal path 300 may be adjusted using other circuits and methods known in the art. DC offset generator 312 may be implemented using a digital-to-analog converter (DAC) circuit known in the art to provide a programmable DC offset via a digital-to-analog conversion. For example, DC offset generator 312 may be implemented using a current steering DAC that provides a programmable offset current to the input and/or to the output of filter 306. Alternatively, other DAC architectures may be used.

In various embodiments summing circuits 316 and 318 may be implemented using analog summing circuits known in the art. In embodiments in which DC offset generator 312 is implemented using a current DAC, such as a current steering DAC, summing circuits 316 and 318 represent a nodal connection between the output of DC offset generator 312 and the input and/or the output of filter 306. In embodiments in which the filter 306 and/or ADC 308 are configured to have current mode inputs and/or outputs, the addition of the offset current generated by DC offset generator 312 may be used to provide the offset. In embodiments in which the filter 306 and/or ADC 308 have voltage mode inputs and/or outputs, the DC offset may be formed by the interaction of the current generated by DC offset generator 312 and the impedance at the input of filter 306 and/or the impedance at the output of filter 306. Summing circuits 316 and/or 318 may also be implemented using operational amplifier-based summing circuits.

In some embodiments, an optional DC offset loop may be used to reduce the amount of DC offset in radar receive signal path 300 using DC offset correction circuits and systems known in the art. In such embodiments, DC offset loop circuit 314 may include a digital filter configured to provide the requisite gain and dynamics to implement DC offset correction. In such embodiments, the time constant of the DC offset loop is set to be longer than the chirp period (also referred to as a "chirp time period") of the radar system in order to prevent the DC offset loop from significantly attenuating changing DC offset value used to improve the linearity performance of radar receive signal path 300. In some embodiments, the time constant of the DC offset loop is ten times greater than the chirp period of the radar system. However, other suitable time constant ratios may be used depending on the particular system and its specifications.

It should be understood that embodiment receive signal path 300 may also be implemented in other types of RF systems besides radar systems. For example, receive signal path 300 could be a receive signal path for an RF communication system. In such embodiments, the DC offset generated by DC offset generator 312 may be adjusted at predetermined time intervals. For example, receive signal path 300 may receive a first RF signal during a first time period, and may receive a second RF signal during a second, subsequent time period. During operation, DC offset generator 312 may apply a first DC offset to the input or output of filter 306 during the first time period and then apply a second DC offset to the input or output of filter 306 during the second, subsequent time period.

FIG. 3B shows a waveform diagram that illustrates the relationship of DC offset 322 generated by DC offset generator 312 and the chirp frequency 324 (also referred to as a "chirp signal") transmitted by the radar system. As shown, in each chirp period, the chirp frequency 324 increases in a linear fashion between a minimum frequency fmin and a maximum frequency fmax. Once chirp frequency 324 reaches maximum frequency fmax at the end of the chirp period, chirp frequency 324 is reset to minimum frequency fmin. In some embodiments n chirps are grouped into a frame and processor 310 generates a range-Doppler map on a frame-by-frame basis. While FIG. 3B shows chirps of increasing frequency, it should be understood that in some embodiments chirp frequency 324 may linearly decrease from maximum frequency fmax at the beginning of each chirp period to minimum frequency fmin at the end of each chirp period. In other embodiments, a chirp periods in which chirp frequency 324 linearly increases alternate with chirp periods in which chirp period of chirp frequency 324 linearly decreases. In other embodiments, various frequencies, chirp periods and frame lengths may be used depending on the specific embodiment and its specifications.

As shown, the DC offset 322 generated by DC offset generator 312 changes at the beginning of each chirp period and is kept constant for the duration of the chirp. At the beginning of the next chirp period, DC offset 322 is changed to a new DC offset value. In some embodiments, DC offset generator 312 produces a random or pseudorandom DC offset 322 at the beginning of each chirp period. In other embodiments, DC offset generator 312 produces a DC offset 322 according to a predetermined pattern, such as a linearly increasing DC offset, a linear decreasing DC offset, as well as other patterns.

FIG. 3C illustrates a schematic of DC offset generator 312 according to an embodiment of the present invention. DC offset generator 312 includes a digital-to-analog converter 374 configured to produce the DC offset. In the illustrated embodiment of FIG. 3C, the digital input to digital-to-analog converter is produced by a pseudorandom number generator 372 (also referred to as a "DC offset value generator"). Pseudorandom number generator 372 may be implemented using pseudorandom number generator circuits and systems known in the art, such as a linear feedback shift register (LFSR). In various embodiments, the output of pseudorandom number generator 372 is configured to change each time a new chirp is transmitted by the radar system. In the depicted embodiment of FIG. 3C, signal Chirp is asserted at the beginning of each transmitted chirp in order to change the value of the DC offset.

FIG. 3D illustrates a schematic of DC offset generator 312 according to a further embodiment. As shown, DC offset generator 312 includes a digital-to-analog converter 374 configured to produce the DC offset. In the illustrated embodiment of FIG. 3C, the digital input to digital-to-analog converter is produced by memory 376 in which a predetermined DC offset pattern is stored. Counter 378 is incremented each time that signal Chirp is asserted at the beginning of each transmitted chirp in order to change the value of the DC offset. In various embodiments, any predetermined DC offset pattern may be stored in memory 376. In some embodiments, memory 376 may be omitted and the output of counter 378 may be applied directly to the digital input of digital-to-analog converter 374 in order to produce a repeating ramp pattern, for example. In some embodiments, memory 376 and/or counter 378 may also referred to as a "DC offset value generator." It should be understood that the examples of FIGS. 3C and 3D are only two of the many possible embodiment implementations of DC offset generator 312.

Figure 4A:
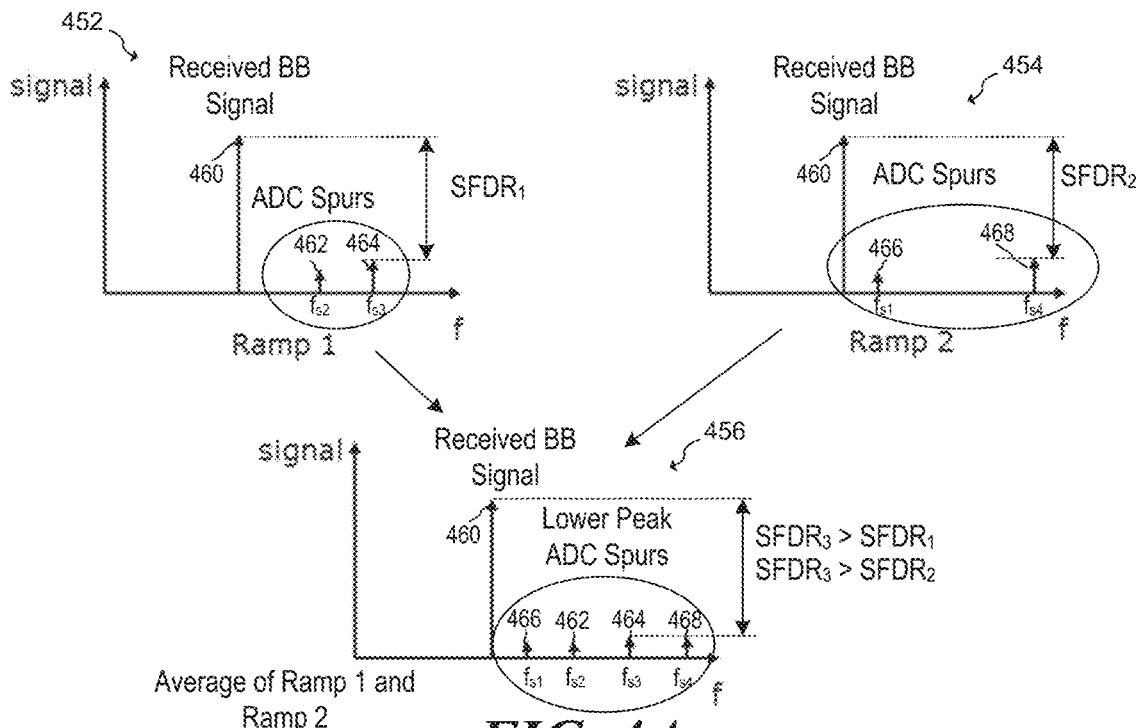
FIG. 4A illustrates a frequency diagram illustrating spurious frequency behavior of an embodiment radar system.

FIG. 4A illustrates frequency diagrams depicting the digitized baseband or intermediate frequency signal during the operation of receive signal path 300. Frequency diagram 452 represents a first FFT taken of the digitized baseband or intermediate frequency signal having a first DC offset value during a first chirp (ramp 1), frequency diagram 454 represents a second FFT taken of the digitized baseband or intermediate frequency signal having a second DC offset value during a second chirp (ramp 2), and frequency diagram 456 represents an average of the first and second FFTs. Frequency diagram 452 depicts a tone 460 representing a detected object during a first chirp (ramp 1), while tone 462 at frequency $f_{s2}$ and tone 464 at frequency $f_{s3}$ represent frequency spurs generated by ADC 308 when ADC 308 operates at a first DC offset level. The resulting $SFDR_1$ is the difference between the power of tone 460 and the power of tone 464, which represents the tone of the highest amplitude.

Frequency diagram 454 depicts a tone 460 representing a detected object during a second chirp (ramp 2), while tone 466 at frequency $f_{s1}$ and tone 468 at frequency $f_{s4}$ represent frequency spurs generated by ADC 308 when ADC 308 operates at a second DC offset level different from the first DC offset level. The resulting $SFDR_2$ is the difference between the power of tone 460 and the power of tone 464, which represents the tone of the highest amplitude. As is apparent from frequency diagrams 452 and 454, spur frequencies $f_{s2}$ and $f_{s3}$, associated with tones 462 and 464 generated during the first chirp after different from spur frequencies $f_{s1}$ and $f_{s4}$ associated with tones 466 and 468 generated during the first chirp. Thus, changing the DC offset has the effect of distributing frequency spurs generated by ADC 308 to different frequencies. Accordingly, when the signal powers of frequency diagrams 452 and 453 are averaged together to form frequency diagram 456, the average power of each spur tone 462, 464, 466 and 468 is reduced with respect to the tone 46 representing the detected object. As a result, the resulting $SFDR_3$ representing the difference between the power of tone 460 and the power of tone 464, which represents the tone of the highest amplitude is greater than SFDR and $SFDR_2$.

Figure 4B:
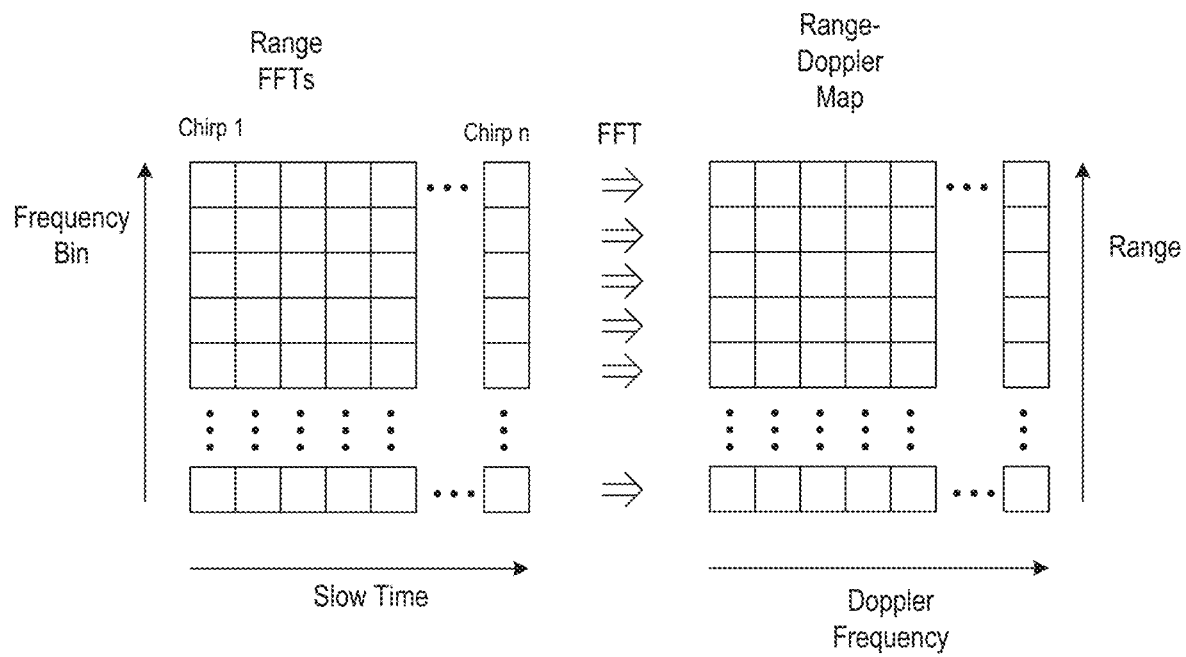
FIG. 4B illustrates a diagram showing an implementation of range FFTs and the production of a range-Doppler map for an embodiment radar system.

In some embodiments, two or more FFTs of the digitized baseband or intermediate frequency signal are averaged together to form an FFT with lower average spur amplitudes. In other embodiments, the improvement in SFDR is seen in the range-Doppler map that is generated based on a series of range FFTs, as shown in FIG. 4B, which illustrates a diagram representing a series of range FFTs and a range-Doppler map corresponding to each chirp of the frame shown in FIG. 3B. Each vertical column of the range FFTs represents a single range FFT corresponding to each chirp 1 though n in slow time; and each row of the range FFTs represents multiple measurements of a single frequency bin corresponding to each chirp 1 though n. In embodiments in which static, non-moving objects are detected by the radar, each row of frequency bins corresponding to the static object detected by the radar will have a persistent value indicative of the received reflected power for the static object. On the other hand, frequency spurs generated by non-linearities of ADC 308 will be non-persistent due to the changing DC level. In order words, ADC generated spurs may appear in some bins of a particular frequency (represented as a particular row) but may be absent or attenuated in other bins of the same frequency.

Once the range FFTs are calculated for a particular frame, a range-Doppler map is generated, for example, by performing an FFT on each row of the range FFTs. The resulting range-Doppler map provides an indication of the velocity of each detected object. Each row of the range-Doppler map represents a particular range or distance from the radar transceiver, while each column of the range-Doppler map represents a Doppler frequency or a velocity of the detected object. Thus, range-Doppler bins representing static or slow moving objects are on the left-hand side of the range-Doppler map, while range-Doppler bins representing fast moving objects are on the right-hand side of the range-Doppler map. Similarly, range-Doppler bins objects that are close to the radar transceiver are represented closer the bottom of the range-Doppler map, while objects farther from the radar transceiver are represented close to the top of the range-Doppler map Advantageously, the energy of ADC generated spurs that appear sporadically in the range FFT (due to the changing DC levels) are spread over multiple bins of the range-Doppler map, thereby improving the SFDR of the signals represented in the range-Doppler map.

Thus, the generation of the range-Doppler map essentially functions as an averaging operation with respect to reducing the amplitude of ADC generated spurs. Accordingly, the creation of the range-Doppler map may also be referred to as an averaging operation with respect to the ADC generated spurs.

In various embodiments, processor 310 may be configured to detect objects in the range-Doppler map by determining which bins in the range-Doppler map have a peak-to-average ratio greater than a threshold peak-to-average ratio. In alternative embodiments, an object may be detected by averaging together two or more range FFTs to form an averaged FFT and determining which frequency bins in the averaged FFT has a peak-to-average ratio greater than a predetermined a threshold peak-to-average ratio. In some embodiments, the threshold may be determined using constant false alarm rate (CFAR) adaptive threshold algorithms known in the art.

Figure 4C:
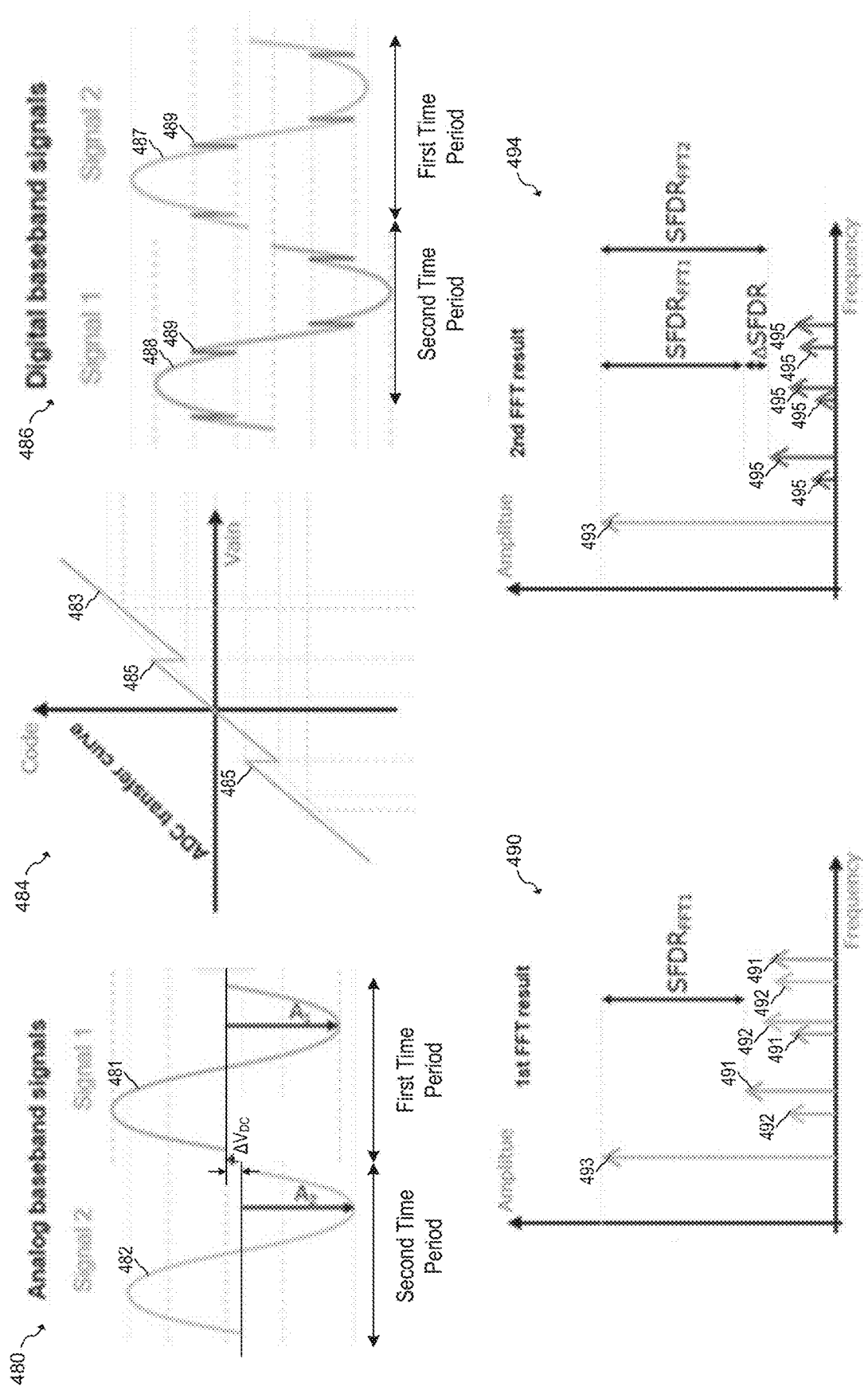
FIG. 4C illustrates waveform and frequency diagrams illustrating the operation of an embodiment radar system.

FIG. 4C includes a set of waveform diagrams that illustrate the various signals within embodiment receive signal path 300 during operation. Waveform diagram 480 illustrates example analog time domain signals 481 and 482 that represent the input to ADC 308 over two consecutive time periods. For ease of illustration, each of analog time domain signals 481 and 482 are each shown as a single period of a sinusoid having the same amplitude; however, it should be understood that other waveforms are possible. For example, in an FMCW embodiment, each of analog time domain signals would appear as a downconverted frequency chirp. As illustrated, analog time domain signal 481 during the first time period has a first DC offset, and analog time domain signal 482 during the second time period has a second DC offset, such that the difference in the two DC offsets is $\Delta V_{DC}$. In various embodiments, these DC offsets are generated by DC offset generator 312 as explained above.

Waveform diagram 484 illustrates the transfer characteristic 483 of ADC 308, where the horizontal axis represents the input voltage of ADC 308 and the vertical axis represents the output of ADC 308. As shown, the transfer characteristic 483 of ADC 308 includes discontinuities 485. It should be understood the transfer characteristic 483 of ADC 308 illustrated in waveform diagram 484 is just one example of many possible transfer characteristics. In alternative embodiments, the nature of the non-linearities of ADC 308 may be different depending on the particular embodiment and it specifications, as well as the design and architecture of ADC 308.

Waveform diagram 486 illustrates example digital time domain signals 487 and 488 that represent the output of ADC 308 over two consecutive time periods. Digital time domain signals 487 and 488 represent a digital version of analog time domain signals 481 and 482 after being digitized by ADC 308 according to transfer characteristic 483 of waveform diagram 484. Non-linearities 489 shown with respect to digital time domain signals 487 and 488 correspond to discontinuities 485 on transfer characteristic 483. However, the relative positions of non-linearities 489 with respect to the each respective sinusoidal shape of digital time domain signals 487 and 488 are different due to the different DC offsets. Because of this, digital time domain signal 487 has a different distortion characteristic from digital time domain signal 488. Therefore, the frequency spectrum of digital time domain signals 487 is different from the frequency spectrum of digital time domain signal 488.

Waveform diagram 490 is a superimposed view of the result of an FFT taken of digital time domain signal 487 (during the first time period with a first DC offset) and an FFT taken of digital time domain signal 488 (during the second time period with a second DC offset). Frequency component 493 represents the fundamental of tone of the sinusoids of digital time domain signals 487 and 488, frequency components 491 represent the spurs present in digital time domain signal 487, and frequency components 492 represent the spurs present in digital time domain signal 488. The SFDR of the FFTs represented in waveform diagram 490 is $SFDR_{FFT1}$, which is the difference in power between frequency component 493 and the highest amplitude frequency component of frequency components 491 and 492.

Waveform diagram 494 represents the result of a second, or range-Doppler FFT taken of the FFTs represented in waveform diagram 490. The illustrated diagram may represent, for example, a single column of the range-Doppler map depicted in FIG. 4B. Frequency component 493 represents the fundamental of tone of the sinusoids of digital time domain signals 487 and 488, and frequency components 495 represent the spurs generated by ADC 308. Due to the averaging effect of the second FFT, and the fact that spurs represented by frequency components 491 and 492 that are associated with digital time domain signals 387 and 388 have different frequency components, the resulting effective SFDR ($SFDR_{FFT2}$) is higher than $SFDR_{FFT1}$ as discussed above with respect to FIG. 4A. In various embodiments, this improvement in SFDR is due to changing the DC offset between the first time period and the second time period.

Figure 5:
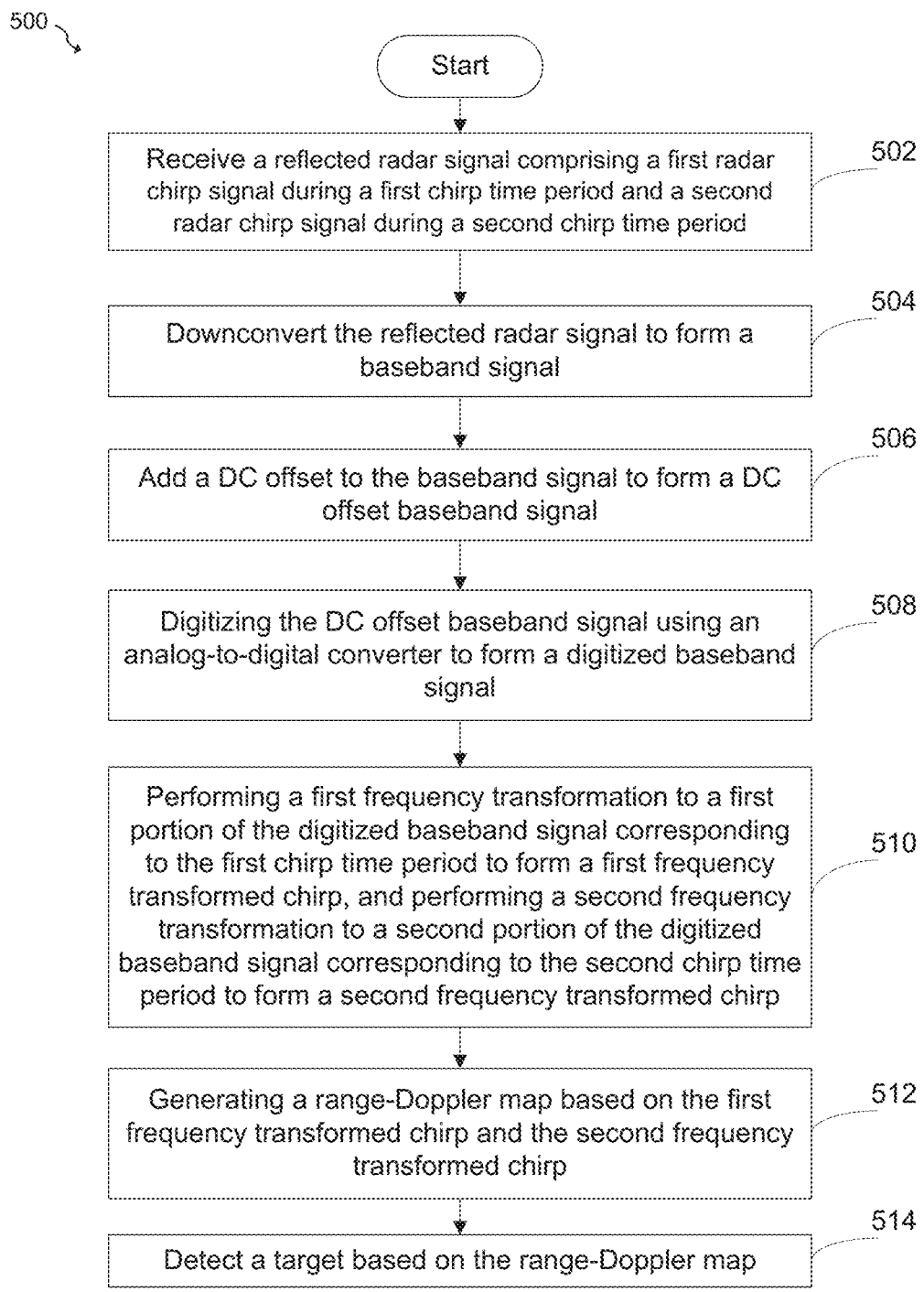
FIG. 5 illustrates a block diagram of an embodiment method.

FIG. 5 illustrates a block diagram of an embodiment method 500. In step 502, a reflected radar signal is received that includes a first radar chirp signal during a first chirp time period and a second radar chirp signal during a second chirp time period. In some embodiments, this radar signal is received using an RF receiver, such as receiver front-end circuit 140 shown in FIG. 1A, radar front-end circuit 132 shown in FIGS. 1A and 1B, and/or RF front end 302 shown in FIG. 3A. In step 504, the reflected radar signal is downconverted to form a baseband signal. This downconversion may be implemented using, for example, an RF mixer known in the art such as mixer 304 shown in FIG. 3A.

In step 506, a DC offset is added to the baseband signal to form a DC offset baseband signal. In some embodiments, adding the DC offset includes adding a first DC offset to the baseband signal during the first chirp time period, and adding a second DC offset to the baseband signal during the second chirp time period, where the first DC offset is different from the second DC offset. In various embodiments, this DC offset may be generated using DC offset generator 312 as shown in FIG. 3A above. In step 508, an analog-to-digital converter is used to digitize the DC offset baseband signal to form a digitized baseband signal. An analog-to-digital converter, such as ADC 308 shown in FIG. 3A may be used, for example, to perform step 508.

In step 510, a first frequency transformation is performed on a first portion of the digitized baseband signal corresponding to the first chirp time period to form a first frequency transformed chirp, and a second frequency transformation is performed on a second portion of the digitized baseband signal corresponding to the second chirp time period to form a second frequency transformed chirp. In various embodiments, an FFT or other frequency transformation algorithm known in the art may be used to perform these frequency transformations.

In step 512, a range-Doppler map based on the first frequency transformed chirp and the second frequency transformed chirp is generated. This range-Doppler map may be generated using FFTs or other frequency transformations as described above with respect to FIG. 3D. In step 514, a target is detected based on the range-Doppler map.

Figure 6:
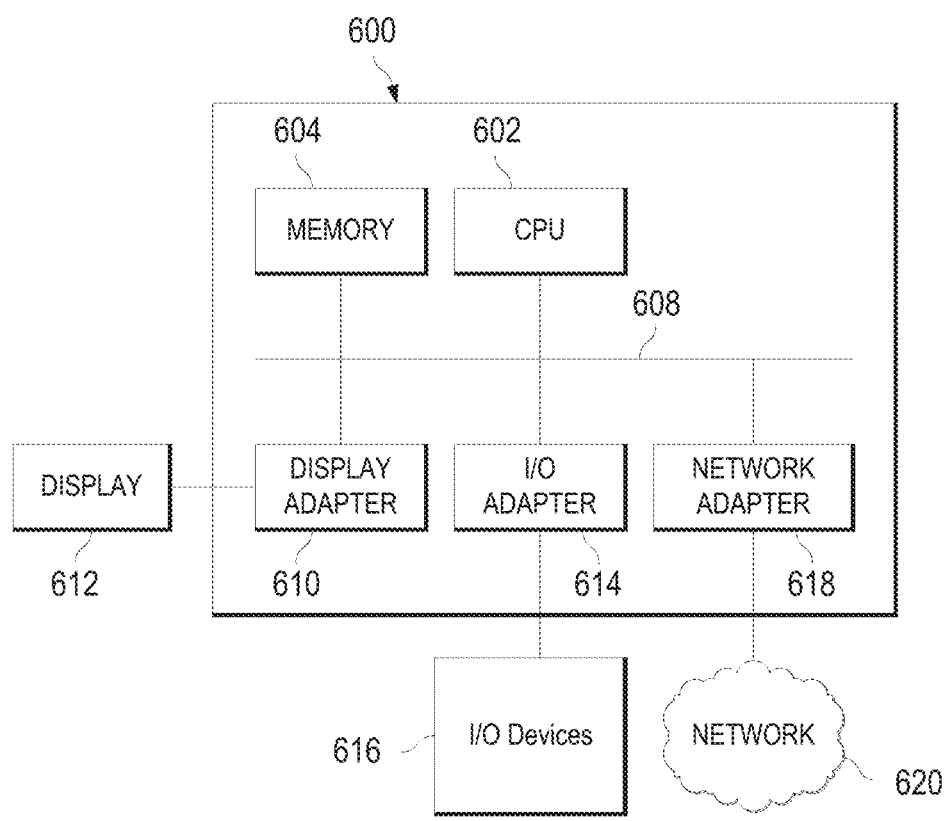
FIG. 6 illustrates a block diagram of a processing system that may be used to implement embodiments systems and methods.

Referring now to FIG. 6, a block diagram of a processing system 60o is provided in accordance with an embodiment of the present invention. The processing system 600 depicts a general-purpose platform and the general components and functionality that may be used to implement portions of the embodiment radar system and/or an external computer or processing device interfaced to the embodiment radar system. For example, processing system 600 may be used to implement all of, or a portion of processing circuitry 134 shown in FIG. 1A or processor 310 shown in FIG. 3A.

Processing system 60o may include, for example, a central processing unit (CPU) 602, and memory 604 connected to a bus 608, and may be configured to perform the processes discussed above. The processing system 60o may further include, if desired or needed, a display adapter 61o to provide connectivity to a local display 612 and an input-output (I/O) Adapter 614 to provide an input/output interface for one or more input/output devices 616, such as a mouse, a keyboard, flash drive or the like.

The processing system 600 may also include a network interface 618, which may be implemented using a network adaptor configured to be coupled to a wired link, such as a network cable, USB interface, or the like, and/or a wireless/cellular link for communications with a network 620. The network interface 618 may also comprise a suitable receiver and transmitter for wireless communications. It should be noted that the processing system 600 may include other components. For example, the processing system 600 may include hardware components power supplies, cables, a motherboard, removable storage media, cases, and the like if implemented externally. These other components, although not shown, are considered part of the processing system 600. In some embodiments, processing system 60o may be implemented on a single monolithic semiconductor integrated circuit and/or on the same monolithic semiconductor integrated circuit as other disclosed system components.

Figure 7:
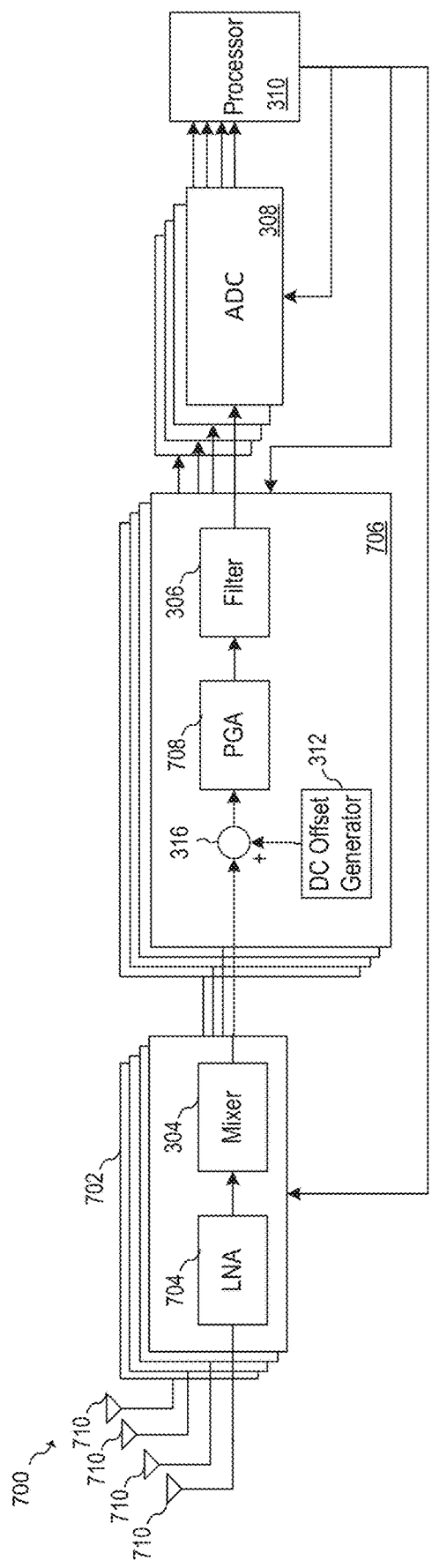
FIG. 7 illustrates a block diagram of an embodiment radar receive signal path that uses multiple receive antennas.

FIG. 7 illustrates an embodiment radar receive signal path 700 that is configured to be coupled to an antenna array including four receive antennas 710. It should be understood that four antennas are shown as a non-limiting example. In alternative embodiments, radar receive signal path 700 may be configured to be support greater or less than four receive antennas 710 depending on the particular embodiment and its specifications. In some embodiments, radar receive signal path 700 may be adapted for use in non-radar systems, such as an RF communication system configured to receive a wireless signal.

Each of antennas 710 are coupled to a respective RF receiver circuit 702 that includes low noise amplifier (LNA) 704 and mixer 304. In some embodiments, RF receiver circuit 702 is a component of a radar transceiver, such as an FMCW radar transceiver. In addition to LNA 704 and mixer 403, RF receiver circuit 702 may also include other suitable circuitry such as directional couplers, switches, filters, matching networks, LO buffers, polyphase filters, and additional RF front end and mixer circuits to support the reception of RF signals from antenna 710.

The output of each mixer 304 of each respective RF receiver circuit 702 is coupled to the input of a respective receive baseband receive signal path 706. Included in baseband receive signal path 706 is summing circuit 316, programmable gain amplifier 708, and filter 306. DC offset generator 312 is coupled to summing circuit 316 and provides a DC offset that changes at the beginning of new chirp as explained with respect to embodiments above. In some embodiments summing circuit 316 is coupled between programmable gain amplifier 708 and filter 306. In some embodiments, programmable gain amplifier 708 provides a variable/controllable gain for baseband receive signal path 706 and may be implemented using variable gain and programmable gain amplifiers known in the art. In some embodiments, the gain of programmable gain amplifier 708 may be controlled by processor 310. Various operational parameters of RF receiver circuits 702, baseband receive signal paths 706, and ADC 308 may be controlled by processor 310 as well. As shown, the output of each respective receive baseband receive signal path 706 is connected to a respective ADC 308, and the output of each ADC 308 is coupled to processor 310.

In various embodiments, the operation of RF receiver circuits 702, baseband receive signal paths 706, ADCs 308 and processor 310 operate according to the single channel systems and methods described above with respect to FIGS. 2A-2C, 3A-3D, 4A-4C, 5 and 6. In addition, processor 310 may be configured to implement beamforming techniques known in the art in order to detect an angle at which a particular target is located.

In non-radar RF embodiments, DC offset generator 312 may be configured to apply a different DC offset a predetermined time intervals. For example, DC offset generator 312 may apply a first DC offset during a first time period, and may apply a second DC offset during a second time period subsequent to the first time period. In some embodiments, each time period may correspond to a time period during which processor 310 performs an FFT or other frequency transformation of the digitized signal produced by ADC 308. In other embodiments, the timing of the change in DC offset is independent of the signal processing performed by processor 310. In such embodiments, periodically changing DC offsets may be beneficial to receiving data encoded using error correcting codes that spread information over many symbols (such as block codes). In such a system, a symbol error introduced during one DC offset time period might be correctable by symbols received during other DC offset time periods in low SNR conditions.

Figure 8:
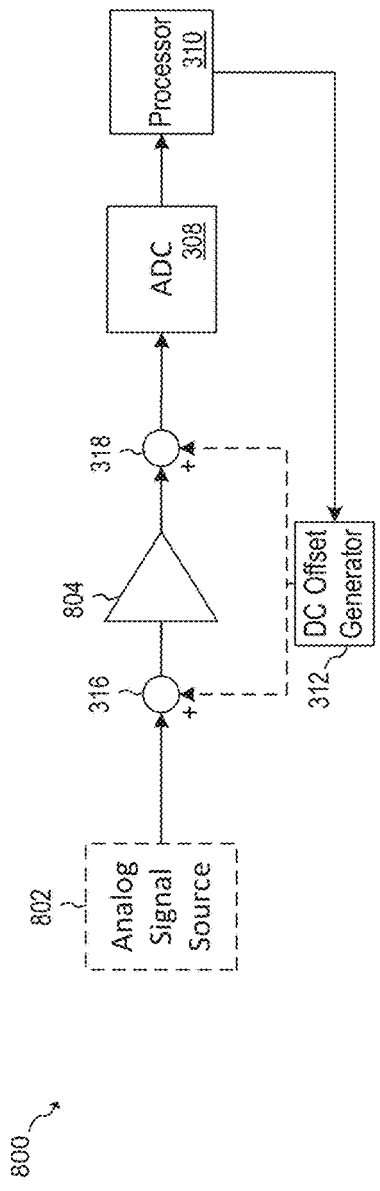
FIG. 8 illustrates a block diagram of an embodiment analog receiver system.

Embodiments concepts may also be applied non-RF systems, as shown in FIG. 8, which illustrates an analog receiver system 800 according to an embodiment of the present inventions. Analog receiver system 800 includes an amplifier 804, ADC 308, processor 310, and DC offset generator 312 configured to apply a DC offset via summing circuit 316 or summing circuit 318. During operation amplifier 804 receives an analog signal from analog signal source 802 and DC offset generator 312 applies a different DC offset at predetermined time periods. ADC 308 digitizes the output of amplifier 804, and processor evaluates the digitized signal according to the requirements of the particular application. Analog signal source 802 could be any analog signal source including, but not limited to a microphone, a sensor, or a wireline communication system.

In one specific example, analog signal source 802 is a microphone, and analog receiver system 800 is a system used to analyze unwanted resonances of a combustion engine, such as an automotive combustion engine. In such an embodiment, the microphone is configured to monitor the sound of the combustion engine, and processor 310 is configured to perform two FFT calculations of the digitized signal produced by ADC 308. During a first time period, the first FFT is performed on the digitized signal and DC offset generator 312 applies a first DC offset to the input or output of amplifier 804, and during a second time period subsequent to the first time period, a second FFT is performed on the digitized signal and DC offset generator 312 applies a second DC offset to the input or output of amplifier 804. In such embodiments, the use of two FFT effectively increases the SFDR of analog receiver system 800 as explained in embodiments above. In some embodiments, DC offset generator is implemented using a resistor ladder and an analog multiplexer having inputs coupled to taps of the resistor ladder. Thus, during operation, the DC offset level produced by DC offset generator 312 may be adjusted by selectively coupling resistor ladder taps to the input or the output of amplifier 804. Amplifier 804 may be implemented using amplifier circuits known in the art including, but not limited to operational amplifiers, operational amplifiers with resistive feedback, switched capacitor amplifiers, source follower amplifiers, and the like.

Embodiments of the present invention are summarized here. Other embodiments can also be understood from the entirety of the specification and the claims filed herein.

Example 1

A method including: receiving a reflected radar signal including a first radar chirp signal during a first chirp time period and a second radar chirp signal during a second chirp time period; downconverting the reflected radar signal to form a baseband signal; adding a DC offset to the baseband signal to form a DC offset baseband signal, adding the DC offset including adding a first DC offset to the baseband signal during the first chirp time period, and adding a second DC offset to the baseband signal during the second chirp time period, where the first DC offset is different from the second DC offset; and digitizing the DC offset baseband signal using an analog-to-digital converter to form a digitized baseband signal.

Example 2

The method of example 1, further including: performing a first frequency transformation on a first portion of the digitized baseband signal corresponding to the first chirp time period to form a first frequency transformed chirp, and performing a second frequency transformation on a second portion of the digitized baseband signal corresponding to the second chirp time period to form a second frequency transformed chirp; generating a range-Doppler map based on the first frequency transformed chirp and the second frequency transformed chirp; and detecting a target based on the range-Doppler map.

Example 3

The method of example 2, where performing the first frequency transformation includes performing a first discrete Fourier transform (DFT), and performing the second frequency transformation includes performing a second discrete Fourier transformation.

Example 4

The method of one of examples 2 to 3, where detecting the target includes determining which bins of the range Doppler map are above a threshold.

Example 5

The method of one of examples 1 to 4, where the first radar chirp and the second radar chirp are within a same frame.

Example 6

The method of one of examples 1 to 5, further including filtering the baseband signal using a filter, where adding the DC offset to the baseband signal including adding the DC offset to an input of the filter or to an output of the filter.

Example 7

The method of one of examples 1 to 6, further including generating the DC offset, generating the DC offset including: determining a first digital offset value and a second digital offset value; and performing a digital-to-analog conversion of the first digital offset value and the second digital offset value to generate the first DC offset and the second DC offset.

Example 8

The method of example 7, where the first digital offset value and the second digital offset value are determined pseudo randomly.

Example 9

The method of example 7 or 8, where the first digital offset value and the second digital offset value are determined deterministically.

Example 10

The method of one of examples 1 to 9, where the analog-to-digital converter creates spurs, and where adding the spurs are distributed to different frequencies for different values of the DC offset.

Example 11

A radar system including: an RF front-end configured to be coupled to an antenna, the RF front-end configured to receive a radar signal including a first radar chirp signal during a first chirp time period and a second radar chirp signal during a second chirp time period; a mixer having an input coupled to an output of the RF front-end; a signal path having an input coupled to an output of the mixer; an analog-to-digital converter having an input coupled to an output of the signal path and an output configured to provide a digitized baseband signal; and a DC offset circuit configured to add a first DC offset in the signal path during the first chirp time period, and configured to add a second DC offset in the signal path during the second chirp time period, where the first DC offset is different from the second DC offset.

Example 12

The radar system of example 11, further including a baseband processor coupled to an output of the analog-to-digital converter, the baseband processor configured to: perform a first frequency transformation to a first portion of the digitized baseband signal corresponding to the first chirp time period to form a first frequency transformed chirp; perform a second frequency transformation to a second portion of the digitized baseband signal corresponding to the second chirp time period to form a second frequency transformed chirp; generate a range-Doppler map based on the first frequency transformed chirp and the second frequency transformed chirp; and detect a target based on the range-Doppler map.

Example 13

The radar system of one of examples 11 or 12, where the signal path includes a filter and the DC offset circuit is configured to add the first DC offset and the second DC offset to an input of the filter or to the output of the filter.

Example 14

The radar system of one of examples 11 to 13, where the analog-to-digital converter includes a pipeline analog-to-digital converter.

Example 15

A radar system including: a frequency modulated continuous wave (FMCW) radar transceiver configured to transmit and receive a plurality of chirps within a frame, where each of the plurality of chirps are transmitted and received in a corresponding plurality of chirp time periods; a baseband receive signal path coupled to a receive output of the FMCW radar transceiver; a DC offset circuit configured to produce a DC offset in the baseband receive signal path, the DC offset having a different DC offset values associated with adjacent chirp time periods of the plurality of chirp time periods; an analog-to-digital converter coupled to an output of the baseband receive signal path; and a signal processing circuit coupled to an output of the analog-to-digital converter, the signal processing circuit configured to perform a plurality of frequency transformations of an output signal of the analog-to-digital converter corresponding to the plurality of chirp time periods to produce a plurality of frequency transformed chirp signals, generate a range-Doppler map based on plurality of frequency transformed chirp signals, and detect a target based on the range-Doppler map.

Example 16

The radar system of example 15, further including a DC offset value generator configured to generate the different DC offset values.

Example 17

The radar system of example 16, where the DC offset value generator is configured to generate the different DC offset values pseudo randomly.

Example 18

The radar system of one of examples 16 or 17, where the DC offset value generator is configured to generate the different DC offset values according to a predetermined pattern.

Example 19

The radar system of example 18, where the predetermined pattern includes a ramp pattern.

Example 20

The radar system of one of examples 18 or 19, where: the FMCW radar transceiver includes a plurality of RF receiver circuits configured to be coupled to a corresponding plurality of receive antennas; and the baseband receive signal path includes a plurality of baseband receive signal paths, a plurality of DC offset circuits, and a plurality of analog-to-digital converters corresponding to the plurality of RF receiver circuits.

Example 21

A method including: receiving a reflected radar signal including a plurality of chirps within a frame, where each of the plurality of chirps are transmitted and received in a corresponding plurality of chirp time periods; downconverting the reflected radar signal to form a baseband signal; adding a DC offset to the baseband signal to form a DC offset baseband signal, adding the DC offset including adding a plurality of DC offsets corresponding to the plurality of chirp time periods; and digitizing the DC offset baseband signal using an analog-to-digital converter to form a digitized baseband signal.

Example 22

The method of example 21, further including: performing a plurality of frequency transformations of the digitized baseband signal corresponding to the plurality of chirp time periods to produce a plurality of frequency transformed chirp signals; generating a range-Doppler map based on the plurality of frequency transformed chirp signals; and detecting a target based on the range-Doppler map.

Example 23

The method of one of examples 21 or 22, further including filtering the baseband signal using a filter, where adding the DC offset to the baseband signal including adding the DC offset to an input of the filter or to an output of the filter.

Example 24

The method of one of examples 21 to 23, where the analog-to-digital converter creates spurs, and where adding the spurs are distributed to different frequencies for different values of the DC offset.

Example 25

The method of one of examples 21 to 24, further including generating the plurality of DC offsets.

Example 26

The method of example 25, where the plurality of DC offsets is generated pseudo randomly.

Example 27

The method of one of examples 21 to 26, where the plurality of DC offsets is generated according to a predetermined pattern.

Example 28

The method of example 27, where the predetermined pattern includes a ramp pattern.

Example 29

A method including: receiving a wireless signal including a first RF signal during a first time period and a second RF signal during a second time period; downconverting the wireless signal to form a baseband signal; adding a DC offset to the baseband signal to form a DC offset baseband signal, adding the DC offset including adding a first DC offset to the baseband signal during the first time period, and adding a second DC offset to the baseband signal during the second time period, where the first DC offset is different from the second DC offset; and digitizing the DC offset baseband signal using an analog-to-digital converter to form a digitized baseband signal.

Example 30

The method of example 29, where the wireless signal includes a radar signal, the first RF signal includes a first chip, and the second RF signal includes a second chirp.

Example 31

A method including: receiving an analog signal including a first signal during a first time period and a second signal during a second time period; adding a DC offset to the received analog signal to form a DC offset signal, adding the DC offset including adding a first DC offset to the received analog signal during the first time period, and adding a second DC offset to the received analog signal during the second time period, where the first DC offset is different from the second DC offset; and digitizing the DC offset signal using an analog-to-digital converter to form a digitized signal.

Example 32

The method of example 31, further including downconverting the received analog signal before adding the DC offset to the received analog signal, where the analog signal includes a wireless signal, the first signal includes a first RF signal, and the second signal includes a second RF signal.

Example 33

The method of one of examples 31 or 32, where the wireless signal includes a radar signal, the first RF signal includes a first chip, and the second RF signal includes a second chirp.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
receiving a reflected radar signal comprising a first radar chirp signal during a first chirp time period corresponding to a first chirp of a plurality of chirps and a second radar chirp signal during a second chirp time period corresponding to a second chirp of the plurality of chirps;
downconverting the reflected radar signal to form an analog baseband signal;
adding a DC offset to the analog baseband signal to form a DC offset analog baseband signal, adding the DC offset comprising adding a first DC offset to the analog baseband signal during the first chirp time period, and adding a second DC offset to the analog baseband signal during the second chirp time period, wherein the first DC offset is different from the second DC offset;
digitizing the DC offset analog baseband signal using an analog-to-digital converter to form a digitized baseband signal; and
detecting a target based on the digitized DC offset analog baseband signal.

2. The method of claim 1, further comprising:
performing a first frequency transformation on a first portion of the digitized baseband signal corresponding to the first chirp time period to form a first frequency transformed chirp, and performing a second frequency transformation on a second portion of the digitized baseband signal corresponding to the second chirp time period to form a second frequency transformed chirp;
generating a range-Doppler map based on the first frequency transformed chirp and the second frequency transformed chirp; and
detecting the target based on the range-Doppler map.

3. The method of claim 2, wherein performing the first frequency transformation comprises performing a first discrete Fourier transform (DFT), and performing the second frequency transformation comprises performing a second discrete Fourier transformation.

4. The method of claim 2, wherein detecting the target comprises determining which bins of the range-Doppler map are above a threshold.

5. The method of claim 1, wherein the first radar chirp signal and the second radar chirp signal are within a same frame.

6. The method of claim 1, further comprising filtering the analog baseband signal using a filter, wherein adding the DC offset to the analog baseband signal comprising adding the DC offset to an input of the filter or to an output of the filter.

7. The method of claim 1, further comprising generating the DC offset, generating the DC offset comprising:
determining a first digital offset value and a second digital offset value; and
performing a digital-to-analog conversion of the first digital offset value and the second digital offset value to generate the first DC offset and the second DC offset.

8. The method of claim 7, wherein the first digital offset value and the second digital offset value are determined pseudo randomly.

9. The method of claim 7, wherein the first digital offset value and the second digital offset value are determined deterministically.

10. The method of claim 1, wherein the analog-to-digital converter creates spurs, and wherein adding the spurs are distributed to different frequencies for different values of the DC offset.

11. A radar system comprising:
an RF front-end configured to be coupled to an antenna, the RF front-end configured to receive a radar signal comprising a first radar chirp signal during a first chirp time period corresponding to a first chirp of a plurality of chirps and a second radar chirp signal during a second chirp time period corresponding to a second chirp of the plurality of chirps;
a mixer having an input coupled to an output of the RF front-end;
an analog signal path having an input coupled to an output of the mixer;
an analog-to-digital converter having an input coupled to an output of the analog signal path and an output configured to provide a digitized baseband signal;

a DC offset circuit configured to add a first DC offset in the analog signal path during the first chirp time period, and configured to add a second DC offset in the analog signal path during the second chirp time period, wherein the first DC offset is different from the second DC offset; and a baseband processor coupled to an output of the analog-to-digital converter, the baseband processor configured to detect a target based on the digitized DC offset analog baseband signal.

12. The radar system of claim 11, wherein the baseband processor is further configured to:

perform a first frequency transformation to a first portion of the digitized baseband signal corresponding to the first chirp time period to form a first frequency transformed chirp;

perform a second frequency transformation to a second portion of the digitized baseband signal corresponding to the second chirp time period to form a second frequency transformed chirp;

generate a range-Doppler map based on the first frequency transformed chirp and the second frequency transformed chirp; and detect the target based on the range-Doppler map.

13. The radar system of claim 11, wherein the analog signal path comprises a filter and the DC offset circuit is configured to add the first DC offset and the second DC offset to an input of the filter or to the output of the filter.

14. The radar system of claim 11, wherein the analog-to-digital converter comprises a pipeline analog-to-digital converter.

15. A radar system comprising:

a frequency modulated continuous wave (FMCW) radar transceiver configured to transmit and receive a plurality of chirps within a frame, wherein each of the plurality of chirps are transmitted and received in a corresponding plurality of chirp time periods;

an analog baseband receive signal path coupled to a receive output of the FMCW radar transceiver;

a DC offset circuit configured to produce a DC offset in the analog baseband receive signal path, the DC offset having different DC offset values associated with adjacent chirp time periods of the plurality of chirp time periods;

an analog-to-digital converter coupled to an output of the analog baseband receive signal path and configured to provide a digitized baseband signal comprising varying DC offset values associated with the adjacent chirp time periods; and a signal processing circuit coupled to an output of the analog-to-digital converter, the signal processing circuit configured to detect a target based on the digitized baseband signal comprising the varying DC offset values by performing a plurality of frequency transformations of the digitized baseband signal comprising the varying DC offset values corresponding to the plurality of chirp time periods to produce a plurality of frequency transformed chirp signals, generating a range-Doppler map based on plurality of frequency transformed chirp signals, and detecting the target based on the range-Doppler map.

16. The radar system of claim 15, further comprising a DC offset value generator configured to generate the different DC offset values.

17. The radar system of claim 16, wherein the DC offset value generator is configured to generate the different DC offset values pseudo randomly.

18. The radar system of claim 16, wherein the DC offset value generator is configured to generate the different DC offset values according to a predetermined pattern.

19. The radar system of claim 18, wherein the predetermined pattern comprises a ramp pattern.

20. The radar system of claim 18, wherein:

the FMCW radar transceiver comprises a plurality of RF receiver circuits configured to be coupled to a corresponding plurality of receive antennas; and the analog baseband receive signal path comprises a plurality of analog baseband receive signal paths, a plurality of DC offset circuits, and a plurality of analog-to-digital converters corresponding to the plurality of RF receiver circuits.

21. The method of claim 1, wherein for each chirp of the plurality of chirps, the DC offset is changed to a new DC offset value associated with the respective chirp.

22. The method of claim 1, wherein the DC offset is changed from the first DC offset to the second DC offset based on starting the second chirp time period.

23. The method of claim 1, wherein adding the DC offset comprises adding the first DC offset to the analog baseband signal during the entire first chirp time period, and adding the second DC offset to the analog baseband signal during the entire second chirp time period.

24. The radar system of claim 11, wherein the DC offset circuit is configured to add the first DC offset in the analog signal path during the entire first chirp time period, and is configured to add the second DC offset in the analog signal path during the entire second chirp time period.

25. The radar system of claim 15, wherein the DC offset circuit is configured to produce the DC offset in the analog baseband receive signal path such that each associated different DC offset value is applied to an entire corresponding adjacent chirp time period of the plurality of chirp time periods.

26. The method of claim 1, further comprising:

monitoring an output of the analog-to-digital converter using a DC offset loop; and modifying a DC value of the DC offset analog baseband signal based on the monitored output of the analog-to-digital converter, wherein a time constant of the DC offset loop is at least ten times greater than the first chirp time period and at least ten time greater than the second chirp time period.

* * * * *